United States Patent
Ni

(10) Patent No.: US 10,944,838 B2
(45) Date of Patent: Mar. 9, 2021

(54) CONTROL DEVICE, RESOURCE MANAGER AND METHODS THEREOF

(71) Applicant: Huawei Technologies Co., Ltd., Shenzhen (CN)

(72) Inventor: Shaoji Ni, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/260,839

(22) Filed: Jan. 29, 2019

(65) Prior Publication Data

US 2019/0173964 A1  Jun. 6, 2019

Related U.S. Application Data

(63) Continuation of application No. PCT/EP2016/070446, filed on Aug. 31, 2016.

(51) Int. Cl.
*H04L 29/08* (2006.01)
*H04W 4/60* (2018.01)

(52) U.S. Cl.
CPC .............. *H04L 67/16* (2013.01); *H04L 67/10* (2013.01); *H04W 4/60* (2018.02)

(58) Field of Classification Search
CPC ........... H04L 67/10; H04L 67/16; H04W 4/60
See application file for complete search history.

(56) References Cited

U.S. PATENT DOCUMENTS 7,321,926 B1 * 1/2008 Zhang .................. G06F 9/5033
455/453

8,856,077 B1 * 10/2014 Roth .................... H04L 67/1095
707/638

(Continued)

FOREIGN PATENT DOCUMENTS

CN  103428025 A  12/2013
CN  105162716 A  12/2015

(Continued)

OTHER PUBLICATIONS

"Network Functions Virtualisation (NFV); Reliability; Report on Models and Features for End-to-End Reliability," ETSI GS NFV-REL 003 V1.1.2, XP014275054, pp. 1-106 (Jul. 2016).

(Continued)

*Primary Examiner* — Azizul Choudhury
(74) *Attorney, Agent, or Firm* — Leydig, Voit & Mayer, Ltd.

(57) ABSTRACT

A control device configured to receive a service request that comprises a request for a resource associated with a network function or a network service in the communication system, obtain a descriptor based on the service request, derive a metadata of a service availability level from the descriptor, obtain a commissioning value, wherein the commissioning value is associated with requirements for a service, map the commissioning value with the metadata of the service availability level, derive the service availability level for the resource associated with the network function or the network service based on the mapped commissioning value with the metadata of the service availability level. A corresponding resource manager derives an assigned resource corresponding to the resource associated with the network function or the network service and the assigned resource fulfills the derived service availability and reliability requirement for the resource.

13 Claims, 4 Drawing Sheets

(56) References Cited

U.S. PATENT DOCUMENTS

| | | | |
|---|---|---|---|
| 9,838,272 B2* | 12/2017 | Djukic | H04L 41/5058 |
| 2013/0166703 A1* | 6/2013 | Hammer | H04L 41/50 709/220 |
| 2014/0317293 A1* | 10/2014 | Shatzkamer | G06F 9/45558 709/226 |
| 2014/0362700 A1 | 12/2014 | Zhang | |
| 2016/0156539 A1 | 6/2016 | Savla et al. | |
| 2017/0244596 A1 | 8/2017 | Chen | |
| 2018/0062943 A1* | 3/2018 | Djukic | H04L 41/5009 |
| 2018/0152381 A1 | 5/2018 | Liu | |

FOREIGN PATENT DOCUMENTS

| | | |
|---|---|---|
| CN | 105282765 A | 1/2016 |
| CN | 105553811 A | 5/2016 |
| EP | 2782291 A1 | 9/2014 |
| WO | 2016180464 A1 | 11/2016 |

OTHER PUBLICATIONS

Mijumbi et al., "Network Function Virtualization: State-of-the-art and Research Challenges," IEEE Communications Surveys & Tutorials, XP055239665, pp. 1-28, Institute of Electrical and Electronics Engineers, New York, New York (2015).

"Network Functions Virtualisation (NFV); Management and Orchestration," ETSI GS NFV-MAN 001 V1.1.1, pp. 1-184, (Dec. 2014).

"Network Functions Virtualisation (NFV); Architectural Framework," ETSI GS NFV 002 V1.2.1, pp. 1-21 (Dec. 2014).

"Network Functions Virtualisation (NFV); Resiliency Requirements," ETSI GS NFV-REL 001 V1.1.1, pp. 1-82 (Jan. 2015).

"Introduction of VNFs in mobile networks," 3GPP TSG-SA5, Telecom Management) Meeting #107, Tenerife, Spain, S5-163241, pp. 1-66, 3rd Generation Partnership Project, Valbonne, France (May 23-27, 2016).

* cited by examiner

CONTROL DEVICE, RESOURCE MANAGER AND METHODS THEREOF

CROSS-REFERENCE TO RELATED APPLICATIONS

This application is a continuation of International Application No. PCT/EP2016/070446, filed on Aug. 31, 2016, the disclosure of which is hereby incorporated by reference in its entirety.

TECHNICAL FIELD

The disclosure relates to a control device and a resource manager. Furthermore, the disclosure also relates to corresponding methods, a computer program, and a computer program product.

BACKGROUND

European Telecommunications Standards Institute (ETSI) has defined network function virtualization (NFV) architectural framework depicting the functional blocks and reference points in the NFV framework. A network service can be viewed architecturally as a forwarding graph of Network Functions (NFs) interconnected by supporting network infrastructure. The underlying network function behavior contributes to the behavior of the higher-level service. Hence, the network service behavior is a combination of the behavior of its constituent functional blocks, which can include individual NFs, NF Sets, NF Forwarding Graphs, and/or the infrastructure network.

Virtualized Network Function (VNF) Forwarding Graph (VNFFG) is the topology of the Network Service (NS) or a portion of the Network Service consisted of a set of VNFs and virtual links connected between VNFs. The Network Service (NS) is described by a few descriptors:
  Network Service (NS) descriptor.
  VNF Forwarding Graph (VNFFG) descriptor.
  Virtualized Network Function (VNF) descriptor.
  Physical Network Function (PNF) descriptor.
  Virtual Link (VL) descriptors.

The Network Service Chaining (NSC) in NFV is the instantiation of the Network Service in VNFNG which includes the instantiation of VNFs and the creation of VLs for network connections inside VNF and between VNF. The creation of VLs has specified the service requirements for steering traffic through VNFNG.

In this disclosure, NFV Network Service Chaining is considered in which a Network Service with one or multiple service types (or user groups) called service flows which are assigned onto the VNFFG. Thus, one NSC could support one or multiple service flows specified with service parameters, such as Quality of Service (QoS), co-location, physical separation, regulation constrains, service reliability and availability, security, etc.

Insider the VNF or PNF, the internal service graph is consisted by a few entities, e.g., resource entities (such as virtual machines (VMs) or containers or computing blades (in PNF case)) and internal virtual link entities, such as vSwitches and physical networking components. Each VM, or container or blade might support multiple processes or SW components. As the extension of NSC into VNF, the internal service chaining (one or multiple service flows) therefore will be supported by networking, HW, Hypervisor, VM, service processes, etc.

From service availability and reliability's point of view, the service availability requirements of a NS are applicable to both the external and internal service chaining.

For a traditional high availability system, e.g., telecom network element, the service availability is quite difficult to be operated from end-to-end. All applications or services in traditional systems are designed with the same level of service availability or resilience without any differentia.

The actual "needed" availability and reliability of the services have not been considered in implementation. For example, web browsing service, could tolerate 20-30 seconds of service interruption because of failure without impacting the user experience. However, the current system provides only one level of resilience typically within 5-10 seconds failure recovery time. Thus, over-provisioning system resource has been assigned to the service with low service availability requirement.

One of the NFV key design objectives has been specified as the end-to-end availability of telecommunication services. This requires that NFV frameworks shall ensure that not all services need to be "built to the peak", but Service Level Agreements (SLAs) can be defined and applied according to given resiliency classes. The service reliability and availability requirements for a few of service availability levels have been specified in NFV. The service availability level is not only given the indication of the priority of service, but also given the service recovery time requirement and priority for failure recovery.

However, it has not been given how end-to-end service availability is operated nor specified any mechanism for end-to-end service availability management.

In a conventional solution it has been proposed to the service availability and reliability management is done in following ways:
  After NFVO obtains the service availability levels (SALs) which are commissioned based on the service flows (in a NS) differently, it sends SALs together with other resource parameters to VIM for requesting the virtual resources for NS instantiation.
  VIM schedules resources based on the service availability and reliability requirements specified by SAL. At the same time, it maintains the established resource to fulfill the requirements.

However, the conventional solution has a number of limitations.

Limitations for the solution of SAL values specified in descriptor are e.g.:
  Since descriptors (e.g., VNFDs, VDUs and VLDs) are shipped by vendors to service providers before the service availability level of each service flow is commissioned by service providers, the values of SAL in descriptors for specifying requirements to the (service) associated virtual resources by vendors might not match the service availability and reliability requirements indicated by the SALs commissioned to service flows by service providers.
  Since VNFs consisted of a network service chain (NSC) might be provided by multiple vendors, each vendor might configure different value of SAL for the same service flow. Thus the SAL values for a service flow in a NS might not be the same and cannot change by the service providers if the values are incompatible (i.e., SAL incompatibility in a NSC (E-to-E incompatibility)).

Limitations in the architecture of service availability management are e.g.:

The consumers of VIM (i.e. NFVO and VNFM) have no functionality to orchestrate the availability and reliability attributes of virtual resources by using SAL.

The consumers of VIM (i.e. NFVO and VNFM) have no visibility for the availability and reliability attributions of the virtual resource managed by VIM. The orchestration of virtual resources could not be managed efficiently according to the principle of the differentiation of service availability.

The requests of the virtual resource establishment to NFVO/VNFM/VIM might be with different values of SAL. However, the solution has not defined how the attributions (e.g., priority for virtual resource allocation/reservation, congestion control, failure recovery, etc.) of service availability and reliability specified by SAL are fulfilled during NS instantiation, NS/VNF scaling, overload and failure or disaster recovery.

In addition, there is limitation in current NFV virtual management specification. A tenant which is one or more NFV MANO service users can share access to a set of physical, virtual or service resources. NFV has defined that the consumers of VIM (i.e. NFVO and VNFM) can specify the requested resource in the pool grouping to a tenant and a location zone. However, the resource pool to a tenant in a location zone may have different availability and reliability attributions, the NFVO or VNFM could not select the resource group with certain availability and reliability attributions.

SUMMARY

An objective of embodiments of the disclosure is to provide a solution which mitigates or solves the drawbacks and problems of conventional solutions.

The above and further objectives are achieved by the subject matter of the independent claims. Further advantageous implementation forms of the disclosure are defined by the dependent claims.

According to a first aspect of the disclosure, the above mentioned and other objectives are achieved with a control device for enabling service availability management in a communication system, the control device comprising a processor configured to receive a service request, wherein the service request comprises a request for a resource associated with a network function or a network service in the communication system, obtain a descriptor based on the service request, derive a metadata of a service availability level from the descriptor, obtain a commissioning value, wherein the commissioning value is associated with requirements for a service, map the commissioning value with the metadata of the service availability level, derive the service availability level for the resource associated with the network function or the network service based on the mapped commissioning value with the metadata of the service availability level.

The descriptor may e.g. be a virtual network function (VNF) descriptor (VNFD) which is a deployment template which describes a VNF in terms of deployment and operational behavior requirements, or a virtual link (VL) descriptor (VLD) which is a deployment template describing the resource requirements that are needed for a link between VNFs, physical network functions (PNFs) and endpoints of a network service. The VNFD also contains connectivity, interface and virtualized resource requirements.

Metadata is generally defined as the data providing information about one or more aspects of the data, it is used to summarize basic information about data which can make tracking and working with specific data easier. The metadata may also in this context be interpreted as a pointer.

The service mentioned in the first aspect may mean telecommunication services. Example of such services are message services, voice services, data services, and streaming services.

A number of advantages are provided by a control device according to the first aspect. The control device according to the first aspect does not only solve incompatibility problem of defining SAL for virtual resources between vendors and service providers but also the incompatibility problem between VNF vendors in a NSC. Further, the control device according to the first aspect solves the problem when the values of SAL in descriptors for specifying requirements to the (service) associated virtual resources by vendors might not match the service availability and reliability requirements indicated by the SALs commissioned to service flows by service providers. This problem arises when the descriptors (e.g., VNFDs, VDUs and VLDs) are shipped by vendors to service providers before the service availability level of each service flow is commissioned by service providers. Moreover, the control device according to the first aspect solves the problem when the SAL values for a service flow in a NS might not be the same and cannot change by the service providers if the values are incompatible (i.e., SAL incompatibility in a NSC (E-to-E incompatibility)). This problem arises when VNFs consisted of a network service chain (NSC) are provided by multiple vendors, each vendor might configure different value of SAL for the same service flow.

In a first possible implementation form of a control device according to the first aspect, the processor is configured to derive a service availability and reliability requirement based on the the derived service availability level, derive a policy for service availability management based on the derived service availability and reliability requirement, wherein the derived policy is associated with the resource, determine a resource request based on the derived policy, send the resource request to a resource manager.

The first implementation form has the advantage that the control device (e.g. as a function in NFVO and VNFM) is able to orchestrate the request for a resource associated with a network function or a network service in the communication system with a policy based on the service availability and reliability requirement of a service. Further, the control device (e.g. as a function in NFVO and VNFM) is able to orchestrate of a resources with a policy based on the service availability and reliability requirement of a service.

In a second possible implementation form of a control device according to the first implementation form of the first aspect, the processor is configured to include the derived service availability level or a resource indication of the derived service availability level in the resource request.

The second implementation form has the advantage, the service availability and reliability requirement to a resource associated with a network function or a network service in the communication system is able to delivering to the resource manager, e.g., as a functionality of the virtualized infrastructure manager (VIM), for resource assignment.

In a third possible implementation form of a control device according to the second implementation form of the first aspect, the resource indication of the derived service availability level is a resource index.

The third implementation form has the advantage that the control device is able to select a resource fulfilling the service availability and reliability requirement to the acquiring resource based on the visibility for the availability and reliability attributions of the virtual resource managed by resource manager (e.g., as a functionality of VIM).

In a fourth possible implementation form of a control device according to the first, second or third implementation form of the first aspect, the processor is configured to receive a resource request response from the resource manager, wherein the resource request response includes an assigned resource corresponding to the resource associated with the network function or the network service, determine a service request response based on the resource request response, transmit the service request response to the communication system.

The fourth implementation form has the advantage that control device is able to receive the response for the corresponding assigned resource from the resource manager and respond to the corresponding service request from the communication system.

In a fifth possible implementation form of a control device according to the fourth implementation form of the first aspect, the processor is configured to obtain the commissioning value from the communication system.

The fifth implementation form has the advantage that the control device can receive the commissioning value (the service availability and reliability requirement indirectly) for mapping with the metadata of service availability level.

According to a second aspect of the disclosure, the above mentioned and other objectives are achieved with a resource manager for a communication system, the resource manager comprising a processor configured to receive a resource request, wherein the resource request includes a service availability level for a resource or a resource indication of the service availability level for the resource, wherein the resource is associated with a network function or a network service in the communication system, derive a service availability and reliability requirement based on the service availability level, derive an assigned resource based on the service availability level or the resource indication, wherein the assigned resource corresponds to the resource associated with the network function or the network service wherein the assigned resource fulfills the derived service availability and reliability requirement for the resource.

A number of advantages are provided by a resource manager according to the second aspect. With the resource manager according to the second aspect it is possible to assign a resource based on a service availability and reliability requirement from a service provided by a network function or a network service in the communication system.

In a first possible implementation form of a resource manager according to the second aspect, the resource indication of the service availability level is a resource index.

The first implementation form has the advantage that the resource manager is able to assign a resource based on a service availability and reliability requirement from a service provided by a network function or a network service in the communication system.

In a second possible implementation form of a resource manager according to the first implementation form of the second aspect or to the second aspect as such, the processor is configured to derive a policy for a service availability management based on the service availability and reliability requirement, derive the assigned resource for the network function or the network service based on the derived policy.

The second implementation form has the advantage that the resource manager is able to orchestrate the request for a resource associated with a network function or a network service in the communication system with a policy based on the service availability and reliability requirement of a service. Further, the resource manager is able to assign the resource with a policy based on the service availability and reliability requirement.

In a third possible implementation form of a resource manager according to the first, second or third implementation form of the second aspect or to the second aspect as such, the processor is configured to include the assigned resource in a resource request response, transmit the resource request response to the control device.

The third implementation form has the advantage that the resource manager is able to respond to the resource request from the control device.

According to a third aspect of the disclosure, the above mentioned and other objectives are achieved with a method for a control device, the method comprising:

receiving a service request, wherein the service request comprises a request for a resource associated with a network function or a network service in the communication system, obtaining a descriptor based on the service request, deriving a metadata of a service availability level from the descriptor, obtaining a commissioning value, wherein the commissioning value is associated with requirements for a service, mapping the commissioning value with the metadata of the service availability level, deriving the service availability level for the resource associated with the network function or the network service based on the mapped commissioning value with the metadata of the service availability level.

In a first possible implementation form of a method according to the third aspect, the method comprising deriving a service availability and reliability requirement based on the the derived service availability level, deriving a policy for service availability management based on the derived service availability and reliability requirement, wherein the derived policy is associated with the resource, determining a resource request based on the derived policy, sending the resource request to a resource manager.

In a second possible implementation form of a method according to the first implementation form of the third aspect, the method comprising including the derived service availability level or a resource indication of the derived service availability level in the resource request.

In a third possible implementation form of a method according to the second implementation form of the third aspect, the resource indication of the derived service availability level is a resource index.

In a fourth possible implementation form of a method according to the first, second or third implementation form of the third aspect, the method comprising receiving a resource request response from the resource manager, wherein the resource request response includes an assigned resource corresponding to the resource associated with the network function or the network service, determining a service request response based on the resource request response, transmitting the service request response to the communication system.

In a fifth possible implementation form of a method according to the fourth implementation form of the third aspect, the method comprising obtaining the commissioning value from the communication system.

According to a fourth aspect of the disclosure, the above mentioned and other objectives are achieved with a method for a resource manager, the method comprising: receiving a resource request, wherein the resource request includes a service availability level for a resource or a resource indication of the service availability level for the resource, wherein the resource is associated with a network function or a network service in the communication system, deriving a service availability and reliability requirement based on the service availability level, deriving an assigned resource based on the service availability level or the resource indication, wherein the assigned resource corresponds to the resource associated with the network function or the network service wherein the assigned resource fulfills the derived service availability and reliability requirement for the resource.

In a first possible implementation form of a method according to the second aspect, the resource indication of the service availability level is a resource index.

In a second possible implementation form of a method according to the first implementation form of the fourth aspect or to the fourth aspect as such, the method comprising deriving a policy for a service availability management based on the service availability and reliability requirement, deriving the assigned resource for the network function or the network service based on the derived policy.

In a third possible implementation form of a method according to the first, second or third implementation form of the fourth aspect or to the fourth aspect as such, the method comprising including the assigned resource in a resource request response, transmitting the resource request response to the control device.

The advantages of the method according to the third or fourth aspect are the same as the corresponding control device or resource manager according to the first or second aspect.

Embodiments of the disclosure also relates to a computer program, characterized in code means, which when run by processing means causes said processing means to execute any method according to the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Embodiments of the disclosure relate to enabling the end to end service availability and reliability deployment in a communication system. Examples of such communication systems are those defined by ETSI.

Figure 1:
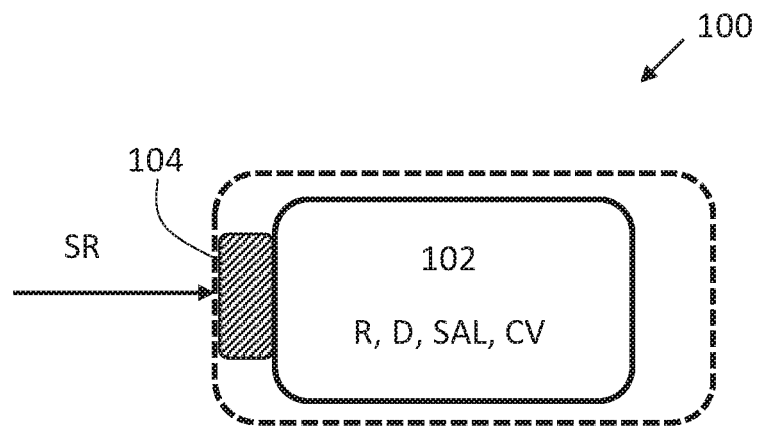
FIG. 1 shows a control device according to an embodiment of the disclosure.

FIG. 1 shows a control device 100 according to an embodiment of the disclosure. The control device comprises a processor 102 coupled to an optional modem 104 as shown in FIG. 1. The modem 104 is configured for wired and/wireless communication with communication devices and entities (not shown in FIG. 1). The processor 102 is configured to receive a service request SR which comprises a request for a resource R associated with a network function or a network service in a communication system 500 (see FIG. 5). The processor 102 is configured to obtain a descriptor D based on the service request SR. The processor 102 is configured to derive a metadata of a service availability level SAL from the descriptor D. The processor 102 is configured to obtain a commissioning value CV, wherein the commissioning value CV is associated with requirements for a service. The processor 102 is configured to map the commissioning value CV with the metadata of the service availability level SAL. The processor 102 is configured to derive the service availability level SAL for the resource R associated with the network function or the network service based on the mapped commissioning value with the metadata of the service availability level SAL.

Figure 2:
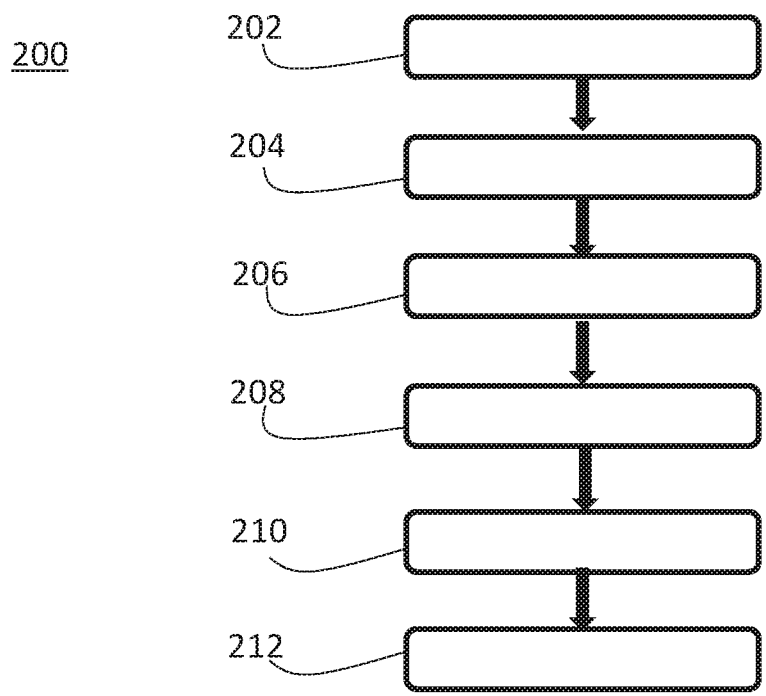
FIG. 2 shows a corresponding method according to an embodiment of the disclosure.

FIG. 2 shows a corresponding method 200 which may be executed in a control device 100, such as the one shown in FIG. 1. The method 200 comprises receiving 202 a service request SR, wherein the service request SR comprises a request for a resource R associated with a network function or a network service in the communication system 500. The method 200 further comprises obtaining 204 a descriptor D based on the service request SR. The method 200 further comprises deriving 206 a metadata of a service availability level SAL from the descriptor D. The method 200 further comprises obtaining 208 a commissioning value CV, wherein the commissioning value CV is associated with requirements for a service. The method 200 further comprises mapping 210 the commissioning value CV with the metadata of the service availability level SAL. The method 200 further comprises deriving 212 the service availability level SAL for the resource R associated with the network function or the network service based on the mapped commissioning value with the metadata of the service availability level SAL.

Figure 3:
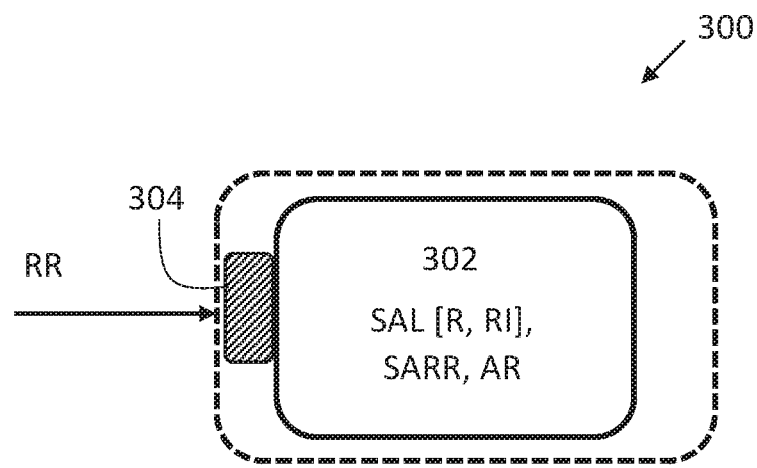
FIG. 3 shows a resource manager according to an embodiment of the disclosure.

FIG. 3 shows a resource manager 300 according to an embodiment of the disclosure. The resource manager 300 comprises a processor 302 coupled to an optional modem 304 as shown in FIG. 3. The processor 302 is configured to receive a resource request RR, wherein the resource request RR includes a service availability level SAL for a resource R or a resource indication RI of the service availability level SAL for the resource R, wherein the resource R is associated with a network function or a network service in the communication system 500. The processor 302 is configured to derive a service availability and reliability requirement SARR based on the service availability level SAL. The processor 302 is configured to derive an assigned resource AR based on the service availability level SAL or the resource indication RI, wherein the assigned resource AR corresponds to the resource R associated with the network function or the network service wherein the assigned resource AR fulfills the derived service availability and reliability requirement SARR for the resource R.

Figure 4:
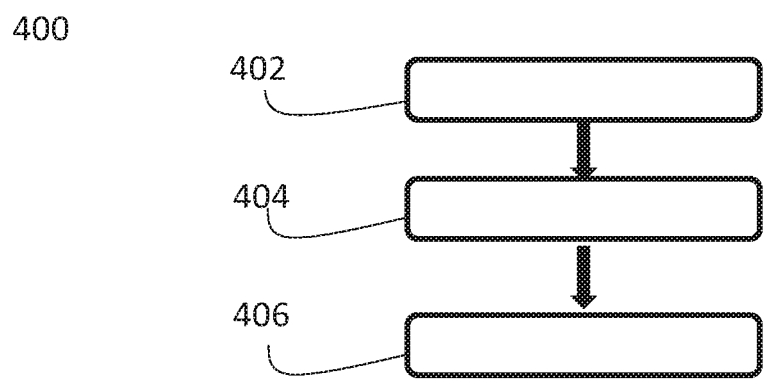
FIG. 4 shows a corresponding method according to an embodiment of the disclosure.

FIG. 4 shows a corresponding method 400 which may be executed in a resource manager 300, such as the one shown in FIG. 3. The method 400 comprises receiving 402 a resource request RR, wherein the resource request RR includes a service availability level SAL for a resource R or a resource indication RI of the service availability level SAL for the resource R, wherein the resource R is associated with a network function or a network service in the communication system 500. The method 400 further comprises deriving 404 a service availability and reliability requirement SARR based on the service availability level SAL. The method 400 further comprises deriving 406 an assigned resource AR based on the service availability level SAL or the resource indication RI, wherein the assigned resource AR corresponds to the resource R associated with the network function or the network service wherein the assigned resource AR fulfills the derived service availability and reliability requirement SARR for the resource R.

Figure 5:
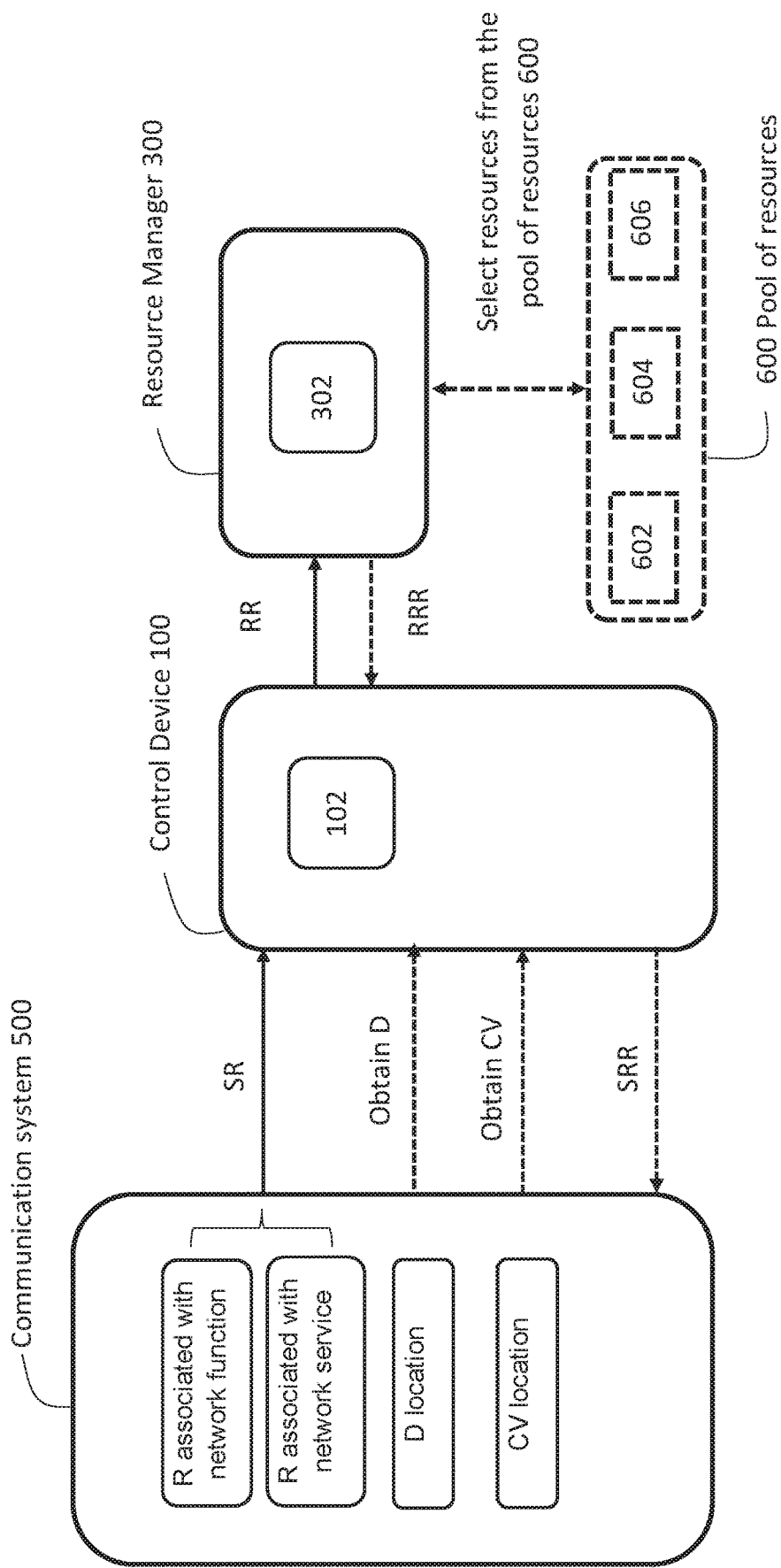
FIG. 5 shows an embodiments of the disclosure comprising a communication system, a control device and a resource manager.
Figure 6:
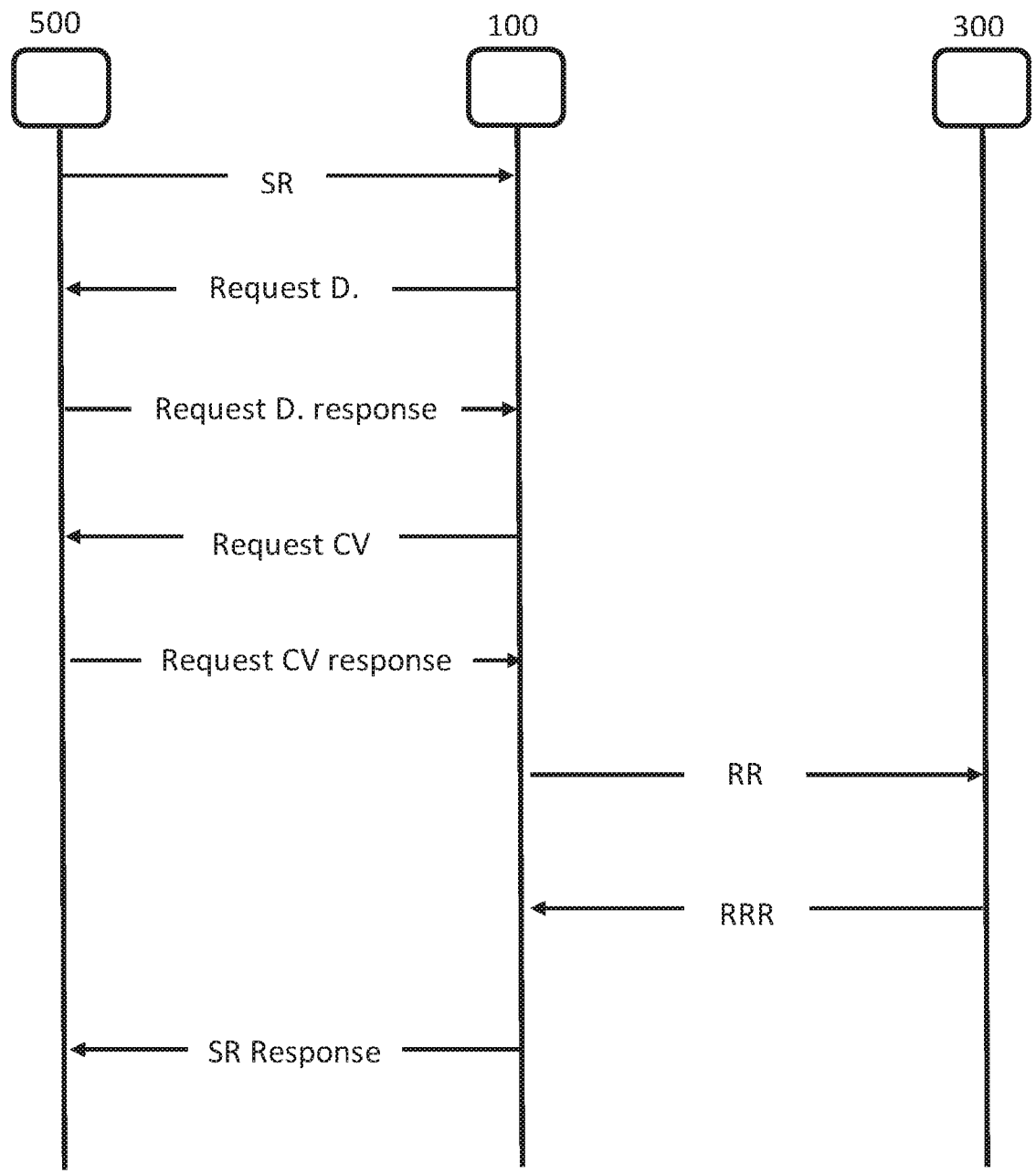
FIG. 6 shows signaling aspects of embodiments of the disclosure.

FIG. 5 shows an embodiments of the disclosure comprising a communication system 500, a control device 100 and a resource manager 300. The dashed arrows and boxes in FIG. 5 are optional features. FIG. 6 shows signaling aspects of embodiments of the disclosure.

With reference to FIGS. 5 and 6 the control device 100 receives a SR from the communication system 500. The SR may comprise request for NF or NS instantiation. In response to receiving the SR, the control device obtains the D and CV, e.g. in response to transmission of request D message and request CV message, i.e. request D response message and request CV response message, respectively. The request CV message may comprise request of CV for SAL requirements for service and indices of services associated with the SAL. Therefore, the communication system 500 comprises resources associated with network function and/or network service. The communication system 500 also comprises D location and CV location in this particular example.

The control device 100 process the SR, D and CV as explained above. The control device 100 is further configured to derive a service availability and reliability requirement SARR based on the the derived SAL. The control device 100 is further configured to derive a policy for service availability management PSAM based on the derived SARR. The derived policy is associated with the resource R. The control device 100 is further configured to determine a resource request RR based on the derived policy, and sends the resource request RR to the resource manager 300. The resource manager 300 derives an assigned resource AR based on the service availability level SAL or the resource indication RI. In this respect, the resource manager 300 select the assigned resource from a pool of resources 600 as shown in FIG. 5 (this signaling is however not shown in FIG. 6). The pool of resources 600 may in an embodiment comprise computing resources 602, storage resources 604, and network resources 606.

In one embodiment, the resource manager 300 is configured to derive a policy for a service availability management PSAM based on the service availability and reliability requirement SARR. Derive the assigned resource AR for the network function or the network service based on the derived policy.

In response to receiving the resource request RR, the resource manager 300 sends a resource request response RRR to the control device 100. The resource request response RRR comprises the assigned resource AR. The control device 100 receives the resource request response RRR from the resource manager 300. The control device 100 determines a service request response SRR based on the resource request response RRR. The control device 100 transmit the service request response SRR to the communication system 500.

The derived policy may in an embodiment comprise at least one of:

A priority level for the assigned resource, wherein the priority level for an assigned resource with a value of higher SAL is higher than the priority level for an assigned resource with a value of lower SAL.

A pre-emptive priority for resource, wherein the assignment of resource with a value of higher SAL has a pre-emptive priority comparing with the assignment of resource with a value of lower SAL.

Revoke at least partly the assigned resource associated with a value of lower SAL before sending a resource assignment request RAR of the resource associated with a value of higher service availability level SAL.

Degrade the SAL associated with the revoked resource.

A priority level for recovering the assigned resource in failure, where the resource with a value of higher SAL has higher priority for failure recovering than the resource with a value of lower SAL.

Other aspects of priority are given in the following, such as send the resource request RR with higher priority than for the resource request RR of resource with lower priority. Send the resource request RR with a pre-emptive priority. Revoke at least partly the acquired resource with a value of lower SAL before sending the resource request RR associated with a value of higher SAL. Degrade the SAL associated with the revoked resource. Lesson the failure notification of assigned resource from the communication system 500, and recover with higher priority for the failure assigned resource with a value of higher SAL than the failure assigned resource with a value of lower SAL, wherein the assignment of the failure resource is initiated by the recovering.

The metadata of SAL is designed for representing the information element of SALs in e.g. NFV descriptors (i.e., VDU, VNFD, VLD, NFP) and is used for accommodating for the SAL which is associated with the service availability and reliability requirements to virtual resources assigned to a network service. By obtaining commissioning value(s) of SALs required for services provided by a network service (NS), the NFVO/VNFM maps the metadata of SAL with the commissioning value(s) of SALs; based on the mapping relation which a service is supported by a virtual resource described by the descriptor.

This solution not only solves incompatibility problem of defining SAL for virtual resources between vendors and service providers but also that between VNF vendors in a NSC. An example: the metadata of SAL=A0001 for virtual resource 1 (VR1) and metadata of SAL=B1111 for virtual resource 2 (VR2) in VNF descriptor. The control device 100 will read the VNF descriptor, and assign VR1 SAL=A0001, VR2 SAL=B1111. Considering software has been programmed when the VNFD is made: VR1 for service 1 with A0001 for representing its SAL, and VR2 for service 2 with B1111 for representing its SAL, if a software processor has provided the user to input SAL value of service 1=1, SAL value of service 2=3, then the control device 100 will map A0001=1 and B1111=3. Thus, VR1 is required for fulfilling a SAL value of 1 which is represented by a set of service availability and reliability requirements, while VR2 is required for fulfilling a SAL value of 3 which is represented by another set of service availability and reliability requirements.

The system of service availability and reliability comprises in some cases the service availability and reliability functionalities in the three entities, Virtual resource controller (VRC), Virtual resource scheduler (VRS), and Virtual resource manager (VRM). In one embodiment the control device 100 is the VRC whilst the resource manager 300 is the VRS and the VRM. The service availability and reliability functionalities of the control device could be implemented in NFVO and/or VNFM, while the service availability and reliability functionalities of resource manager could be implemented in in a VIM.

When the functionality in NFVO/VNFM/VIM proceeds the virtual resource establishment (e.g., allocation or reservation) requests for instantiating instances or virtual links, or for recovering instances or virtual links from anomaly (e.g., failure, or overload), it derives the value of SAL associated with virtual resources from descriptors (for the functionality in NFVO/VNFM) or from the requested message (for the functionality in VIM), and proceed the virtual resource establishment procedure based on the SAL and/or defined policies associated with SAL.

When the functionality in NFVO/VNFM requests the functionality in VIM for scheduling virtual resources for instances and virtual links, a resource index I called indication of service availability level which is used to define the service availability level(s) of the virtual resources or the value(s) of service availability level(s) is included in the requested message. The NFV Infrastructure (NFVI) resources have been classified according to attributions of service availability and reliability into a few groups by a functionality of VIM (e.g., the resource manager 300). The resources of each group are considered to be classified as a certain SAL and are associated with a resource index I called as the indication of SAL. A functionality of NFVO and or VNFM (e.g., the control device 100) has obtained the indication of service availability from VIM. By the availability and reliability mechanism provided, NFVO and VNFM are able to orchestrate the availability and reliability attributes of virtual resources according to defined SAL of service flows.

System and method for availability and reliability management according to an embodiment includes functionalities of availability and reliability in three components:

Virtual resource controller (VRC—i.e. control device 100) configured to orchestrating virtual resource with the context of service availability and reliability.

Virtual resource scheduler (VRS—i.e. resource manager 300) configured to scheduling VR with the context of service availability and reliability Virtual resource manager (VRM—i.e. resource manager 300) configured to managing virtual resource with the context of service availability and reliability attributes.

The VRM can on the request of administrator classify each NFVI resource (computing resources, storage resources and network resources) pool into a few (logical or physical) subgroups, called SAL groups, according to resource attributes of availability and reliability, such as the failure recovery time, failure detection time, hardware reliability parameters, failure isolation, redundancy mechanism, failure prediction and prevention, and other high availability features. The higher SAL of resources, the shorter the service recovery time and the lower the failure probability. The NFVI resource classification based on the attributions of availability and reliability. The VRM is able to install or uninstall directly and indirectly the high availability features in NFVI resources. The VRM is also able to monitor NFVI resource and manage the service availability levels of NFVI resources. The "service availability level" classification request for NFVI resource to VRM might come from VRC as another alternative than from administrator. The VRM may rerun to VRC with the resource indexes which represent the indication of service availability level and are used for mapping to each NFVI resource group with corresponding SALs.

VRC establishes (i.e., allocates or reserves) virtual resources for instances or virtual links. The virtual resource establishment may be from the request of instantiating new instances or virtual links, or from failure recovery for recovering the affected instances or virtual links. When the VRC is required for establishing to virtual resources (by other functionality in MANO), it decodes the requesting message or from descriptors (such as VNF, or VDU and VLD descriptors indicated by the requesting message) to obtain the SALs for the required associated resources. The SAL is the abstraction of service availability and reliability requirements for virtual resources. The VRC derives the service availability requirements from the value of SAL associated with virtual resources. The requirements are included the priority for resource allocation or reservation, the priority for resource congestion control, the priority for failure recovery, level of service recovery time, level of failure probability, etc.

When multiple requests to VRC for virtual resource establishment, VRC established virtual resource based on the SAL (i.e., the priority of resource allocation/reservation), the higher the level, the sooner the resources to be established. During congestion because of limited resource available, instances and virtual links with higher service availability level have the privilege of pre-empting resources of those with lower SAL or have higher share resources than those with lower SAL; e.g., de-allocating resources (or scaling in/down) from instances with low SAL, and reallocate (or scaling out/up) them to instances with high SAL. During failure or disaster, instances and virtual links with higher SAL have higher priority for failure recovering than those with lower SAL. During natural disaster, the recovering might need to pre-empt resources of instances and virtual links and degrade the grade of their corresponding supporting services. Those principles according to defined policies for handling multiple requests based on the SAL in requests are applicable to VRS for requests of scheduling virtual resources.

VRC requests VRS for scheduling virtual resources after VRC has been requested for the virtual resource establishment for instances and virtual links according to following cases:

Based on the SAL obtained from the request of virtual resource establishment, the VRC selects the corresponding the resource group which has been classified by VRM based on the attributes of availability and reliability, and delivers the resource index I mapping to the selected resource group in the request message to VRS; if VRM has classified each NFVI resource pools into subgroups of SAL and has provided the identification information (i.e., resource index I) of the resource groups to VRC.

If VRM has not provided any availability and reliability attributes of NFVI to VRC, VRC includes the SAL into the request message which is sent to VRS for virtual resource scheduling.

The VRS is based on resource index I mapping to the resource groups of SALs to schedule virtual resources for the resource request from VRC. As an alternative, when VRS receives virtual resource scheduling request from VRC which includes SAL in the requesting message, it delivers the SAL to VRM and gets the resources with reliability attributes specified by SAL. Response to VRC for the establishment of virtual resources.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the control device 100 and the resource manager 300 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present control device 100 and resource manager 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A control device for service availability management in a communication system, the control device comprising a processor configured to:
receive a service request, wherein the service request comprises a request for a resource associated with a network function or a network service in the communication system;
obtain a descriptor based on the service request, wherein the descriptor includes one of a virtual network function descriptor or a virtual link descriptor;
determine metadata of a service availability level based on the descriptor;
obtain a commissioning value, wherein the commissioning value is associated with requirements for a service;
determine the service availability level for the resource associated with the network function or the network service based on the commissioning value and the metadata of the service availability level;
determine a service availability and reliability requirement based on the service availability level;
determine a policy for service availability management based on the service availability and reliability requirement, wherein the policy is associated with the resource;
determine a resource request based on the policy; and
send the resource request with a pre-emptive priority for the resource to a resource manager device, wherein a first resource has a first value of a service availability level and a second resource has a second value of a service availability level, wherein the first value is higher than the second value, and wherein the first resource has a pre-emptive priority compared with a resource with the second resource.

2. The control device according to claim 1, wherein the processor is further configured to:
include the service availability level or a resource indication of the service availability level in the resource request.

3. The control device according to claim 2, wherein the resource indication of the service availability level is a resource index.

4. The control device according to claim 1, wherein the processor is further configured to:
receive a resource request response from the resource manager device, wherein the resource request response includes an assigned resource corresponding to the resource associated with the network function or the network service;
determine a service request response based on the resource request response; and
transmit the service request response to the communication system.

5. The control device according to claim 1, wherein the processor is further configured to obtain the commissioning value from the communication system.

6. A resource manager for a communication system, the resource manager comprising a processor configured to:
classify network function virtualization infrastructure resources in to a plurality of resource groups according to attributions of service availability and reliability;
receive a resource request for scheduling virtual resources for instances and virtual links, wherein the resource request includes a value of a service availability level for a resource or a resource indication of the service availability level for the resource, wherein the resource is associated with a network function or a network service in the communication system, and wherein a first resource with a first value of a service availability level has a pre-emptive priority compared with a second resource with a second value of a service availability level, wherein the first value is higher than the second value, and wherein the resource indication of the service availability level for the resource is associated with one of the plurality of groups of network function virtualization infrastructure resources;

determine a service availability and reliability requirement based on the value of the service availability level or the resource indication of the service availability level; and determine an assigned resource based on the value of the service availability level or the resource indication of the service availability level, wherein the assigned resource corresponds to the resource associated with the network function or the network service, and wherein the assigned resource fulfils the service availability and reliability requirement for the resource.

7. The resource manager according to claim 6, wherein the resource indication of the service availability level is a resource index.

8. The resource manager according to claim 6, wherein the processor is further configured to:
   determine a policy for a service availability management based on the service availability and reliability requirement; and
   determine the assigned resource for the network function or the network service based on the policy.

9. The resource manager according to claim 6, wherein the processor is further configured to:
   include the assigned resource in a resource request response; and
   transmit the resource request response to a control device.

10. A method for service availability management, the method comprising:
    receiving, by a control device, a service request, wherein the service request comprises a request for a resource associated with a network function or a network service in a communication system;
    obtaining, by the control device, a descriptor based on the service request, wherein the descriptor includes one of a virtual network function descriptor or a virtual link descriptor;
    determining, by the control device, metadata of a service availability level based on the descriptor;
    obtaining, by the control device, a commissioning value, wherein the commissioning value is associated with requirements for a service;
    determining, by the control device, the service availability level for the resource associated with the network function or the network service based on the commissioning value and the metadata of the service availability level;
    determining, by the control device, a service availability and reliability requirement based on the service availability level;
    determining, by the control device, a policy for service availability management based on the service availability and reliability requirement, wherein the policy is associated with the resource;
    determining, by the control device, a resource request based on the policy; and
    sending, by the control device, the resource request with a pre-emptive priority for the resource to a resource manager device, wherein a first resource has a first value of a service availability level and a second resource has a second value of a service availability level, wherein the first value is higher than the second value, and wherein the first resource has a pre-emptive priority compared with a resource with the second resource.

11. A method, comprising:
    classifying, by a resource manager device, network function virtualization infrastructure resources in to a plurality of resource groups according to attributions of service availability and reliability;
    receiving, by the resource manager device, a resource request, wherein the resource request includes a value of a service availability level for a resource or a resource indication of the service availability level for the resource, wherein the resource is associated with a network function or a network service in a communication system, and wherein a first resource with a first value of a service availability level has a pre-emptive priority compared with a second resource with a second value of a service availability level, wherein the first value is higher than the second value, and wherein the resource indication of the service availability level for the resource is associated with one of the plurality of groups of network function virtualization infrastructure resources;
    determining, by the resource manager device, a service availability and reliability requirement based on the value of the service availability level or the resource indication of the service availability level; and
    determining, by the resource manager device, an assigned resource based on the value of the service availability level or the resource indication of the service availability level, wherein the assigned resource corresponds to the resource associated with the network function or the network service, and wherein the assigned resource fulfils the service availability and reliability requirement for the resource.

12. A non-transitory computer readable storage medium comprising a program code that, when executed by a processor, causes the processor to:
    receive a service request, wherein the service request comprises a request for a resource associated with a network function or a network service in the communication system;
    obtain a descriptor based on the service request, wherein the descriptor includes one of a virtual network function descriptor or a virtual link descriptor;
    determine metadata of a service availability level based on the descriptor;
    obtain a commissioning value, wherein the commissioning value is associated with requirements for a service;
    determine the service availability level for the resource associated with the network function or the network service based on the commissioning value and the metadata of the service availability level;
    determine a service availability and reliability requirement based on the service availability level;
    determine a policy for service availability management based on the service availability and reliability requirement, wherein the policy is associated with the resource;

determine a resource request based on the policy; and send the resource request with a pre-emptive priority for the resource to a resource manager device, wherein a first resource has a first value of a service availability level and a second resource has a second value of a service availability level, wherein the first value is higher than the second value, and wherein the first resource has a pre-emptive priority compared with a resource with the second resource.

13. A non-transitory computer readable storage medium comprising a program code that, when executed by a processor, causes the processor to:

classify network function virtualization infrastructure resources in to a plurality of resource groups according to attributions of service availability and reliability;

receive a resource request for scheduling virtual resources for instances and virtual links, wherein the resource request includes a value of a service availability level for a resource or a resource indication of the service availability level for the resource, wherein the resource is associated with a network function or a network service in the communication system, and wherein a first resource with a first value of a service availability level has a pre-emptive priority compared with a second resource with a second value of a service availability level, wherein the first value is higher than the second value, and wherein the resource indication of the service availability level for the resource is associated with one of the plurality of groups of network function virtualization infrastructure resources;

determine a service availability and reliability requirement based on the value of the service availability level or the resource indication of the service availability level; and determine an assigned resource based on the value of the service availability level or the resource indication of the service availability level, wherein the assigned resource corresponds to the resource associated with the network function or the network service, and wherein the assigned resource fulfils the service availability and reliability requirement for the resource.

* * * * *